V. V. MESSER.
VALVE.
APPLICATION FILED MAR. 13, 1911.
1,000,617.
Patented Aug. 15, 1911.
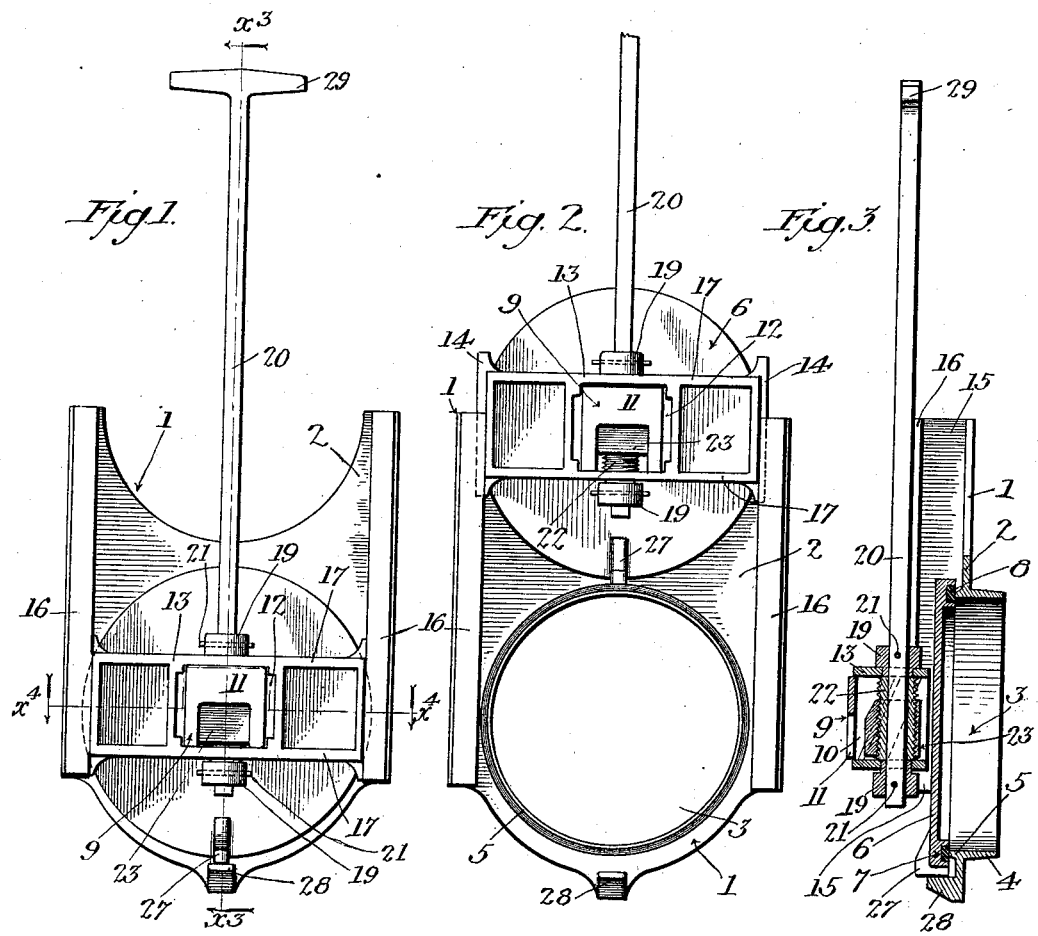
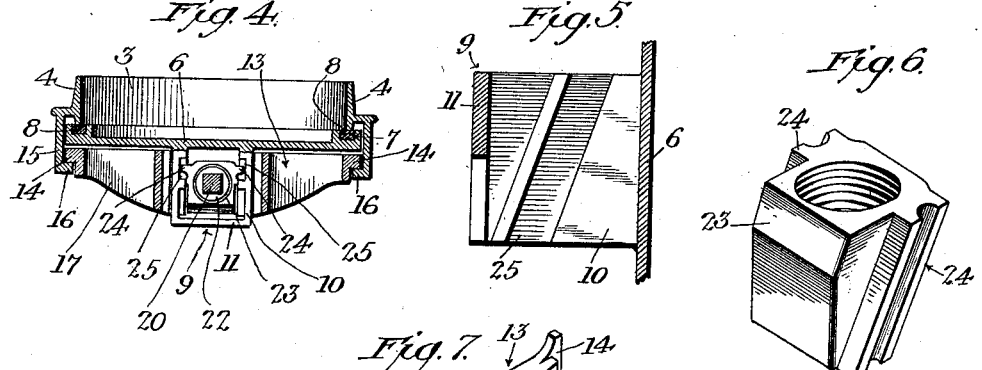
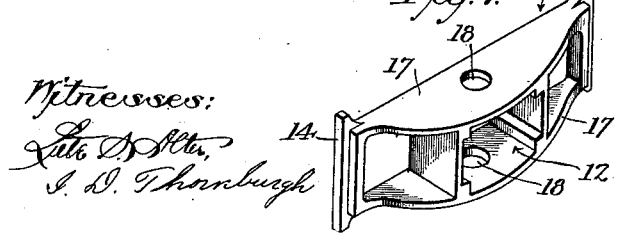

UNITED STATES PATENT OFFICE.

VLADIMIR V. MESSER, OF LOS ANGELES, CALIFORNIA, ASSIGNOR TO H. J. BRUBAKER, J. B. BRUBAKER, AND ELMER E. TEAGUE, ALL OF SAN DIMAS, CALIFORNIA.

VALVE.

1,000,617.   Specification of Letters Patent.   Patented Aug. 15, 1911.

Application filed March 13, 1911. Serial No. 614,243.

*To all whom it may concern:*

Be it known that I, VLADIMIR V. MESSER, a citizen of the United States, residing at Los Angeles, in the county of Los Angeles and State of California, have invented a new and useful Valve, of which the following is a specification.

This invention relates to a device for controlling the flow of water from an irrigation or other water system and more particularly to a valve of the vertically movable type, and one of the main objects of the invention is to produce a valve of the class described provided with a gate which may be readily raised or lowered and retained in any desired position by a single operating means.

Another object of the invention is to produce a device of the character described, of economical and simple construction.

Other objects and advantages will appear hereinafter from the following specification.

Referring to the drawings, which are for illustrative purposes only: Figure 1 is an elevation showing the outer side of the valve with the gate in closed position. Fig. 2 is a view similar to Fig. 1, showing the gate in raised or open position. Fig. 3 is a vertical sectional view on line $x^3$—$x^3$ Fig. 1. Fig. 4 is a horizontal sectional view on line $x^4$—$x^4$ Fig. 1. Fig. 5 is a vertical sectional view through a portion of the gate or closure member. Fig. 6 is a perspective view of the non-revoluble nut forming part of the operating mechanism. Fig. 7 is a perspective view of a cross-head or carrier.

The valve consists of a stationary member 1 formed in the present instance of cast iron and consisting of a plate 2 having a central opening 3, and an annular flange 4 projecting inwardly therefrom for the purpose of affording fastening means to the pipe or flume on which the valve is used. Formed around the edge of the central opening 3 is an annular flange 5 forming a valve seat for the gate or closure member 6. The gate 6 in the present instance is circular in form and is provided on its inner face with an annular groove 7 in which is seated a gasket 8. The groove 7 is so placed in the face of the gate 6 that the gasket 8 is adapted to be seated on the annular flange or seat 5 on the stationary member 1.

Projecting outwardly from the gate 6 is a hollow extension 9 having side walls 10 and an outer wall 11 connecting the two side walls. The extension 9 on the gate 6 is received in a central opening 12 formed in a cross-head 13. The cross-head 13 is provided at each end with a tongue 14 adapted to be received by vertical guides formed on the stationary member 1 and consisting of extensions 15 terminating along their outer edge in flanges 16. The upper and lower bars 17 of the cross-head 13 are each provided with a central bore 18 for receiving shouldered collars 19 which form bearings for a vertical square operating shaft or rod 20 which is secured to the collars 19 by means of pins 21.

Between the upper and lower bars 17 of the cross-head 13 in the central opening 12 heretofore referred to, is a screw-member 22 having a square bore longitudinally disposed therethrough, through which the square operating shaft 20 passes. Threaded on the screw member 22 is a non-revoluble nut of brass 23, provided on the opposite sides thereof with inclined lugs or extensions 24 adapted to bear against the walls of inclined grooves 25 formed in the walls of the extension 9 on the gate 6, the length of the non-revoluble nut 23 being shorter than the distance between the upper and lower bars 17 of the cross-head 13.

The gate 6 is provided at its lower edge with a projection or lug 27 which is adapted to strike and rest upon a stop or lug 28 on the stationary member 1 when the gate 6 is in lowered or closed position for the purpose of supporting the weight of the movable parts of the valve and at the same time position the gate 6 over the seat 5 on the stationary member 1, so that the gasket 8 is in proper relation to the seat 5. The operating shaft or bar 20 is provided at its upper end with operating means consisting of a T-head 29.

The valve is operated in the following manner: The gate 6 is held in closed position against the seat 5 on the stationary member 1 by a clamping action which takes place between the gate 6 and the seat 5 on the stationary member 1 and the tongues 14 on each end of the cross-head 13 and the flanges 16 on the vertical guides of the stationary member 1. This is produced by turning the operating shaft 20 which in turn imparts movement to the screw-member causing the nut, which being non-revoluble, to travel along the screw member 22 into its lower position shown in Fig. 3. The grooves 25 in the sides of the extension 9 on the gate 6 being in engagement with the lugs 24 on the side of the nut 23 and the grooves being inclined, cause the extension 9 and the gate 6 to move laterally in relation to the operating shaft 20, thereby clamping the gate 6 against its seat 5 on the stationary member 1, and causing the cross-head 13 to bear against the flanges 16 on the guides of the stationary member 1. When it is desired to change the position of the gate 6 for the purpose of opening the same, the operating shaft 20 is turned in the reverse direction from that heretofore described in the operation of closing the gate, which action causes the non-revoluble nut 23 to ride upwardly on the screw member 22, thereby forcing the gate to move toward the operating shaft 20 and away from its seat 5, due to the action of the lugs 24 on the nut 23 traveling in the inclined grooves 25 in the extension formed on the gate 6. When this action has taken place, the operating bar 20 may be lifted bodily, vertically, thereby raising the cross-head 13 in the guides on the stationary member 1 and carrying therewith the valve gate 6 as the extension on the valve gate 6 is confined between the upper and lower bar of the cross-head 13. When the gate 6 is raised to the position desired, the operating bar or shaft 20 is turned, as heretofore described, in the direction to produce the clamping action heretofore described.

What I claim is:

1. A valve comprising a stationary member having an outlet opening therein, a seat on said member about said opening, guides on said stationary member, a cross-head movable in said guides, a closure member carried on said cross-head, and having inclined grooves, a threaded shaft, a non-revoluble nut on the shaft, having inclined lugs engaging the inclined grooves of the closure member for moving said closure member laterally from said cross-head against said seat.

2. A valve comprising a stationary member having an outlet opening therein, a seat on said member about said opening, extensions on said stationary member, flanges on said extensions, a cross-head movable in said extensions on the closure member on the inner side of said flanges, an extension on said closure member extending into said cross-head, and having inclined grooves, a threaded shaft, a non-revoluble nut on the shaft, having inclined lugs engaging the inclined grooves of the closure member to move said gate inwardly against the seat on the stationary member.

3. A valve comprising a stationary member having an outlet opening therein, a seat on said member about said opening, guides on said stationary member, a cross-head movable in said guides, a closure member, a hollow extension on said closure member extending into said cross-head and having inclined grooves therein, an operating shaft extending through said extension, a screw member on said operating shaft, a non-revoluble nut on said screw member, and lugs on said nut extending into the grooves in the extension on the closure member.

4. A valve comprising a stationary member having an outlet opening therein, a seat on said member about said opening, guides on said stationary member, flanges on the outer edges of said guides, a cross-head movable in said guides against said flanges, a closure member, a hollow extension on said closure member provided with inclined grooves on its inner face, an operating shaft extending through said hollow extension, a screw member fast to said operating shaft, a non-revoluble nut on said screw member, and lugs on said nut extending into the grooves in the hollow extension on the gate.

In testimony whereof, I have hereunto set my hand at Los Angeles, California, this 7th day of March 1911.

VLADIMIR V. MESSER.

In presence of—
 FRANK L. A. GRAHAM,
 P. H. SHELTON.

---

Copies of this patent may be obtained for five cents each, by addressing the "Commissioner of Patents, Washington, D. C."